A. J. BOYLE.
SEWER PIPE.
APPLICATION FILED FEB. 7, 1914.
1,158,415.　　　　　　　　　　　　　Patented Oct. 26, 1915.
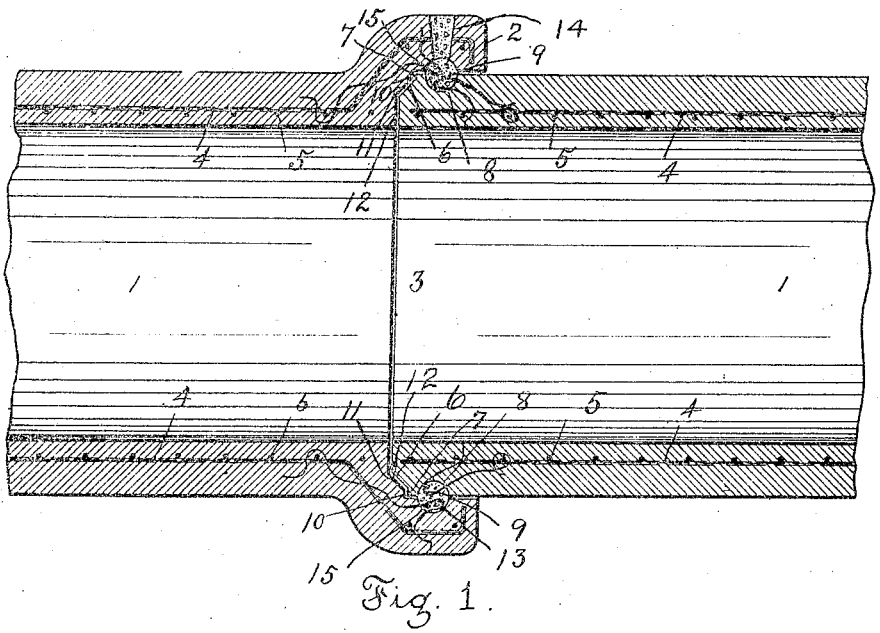
Fig. 1.
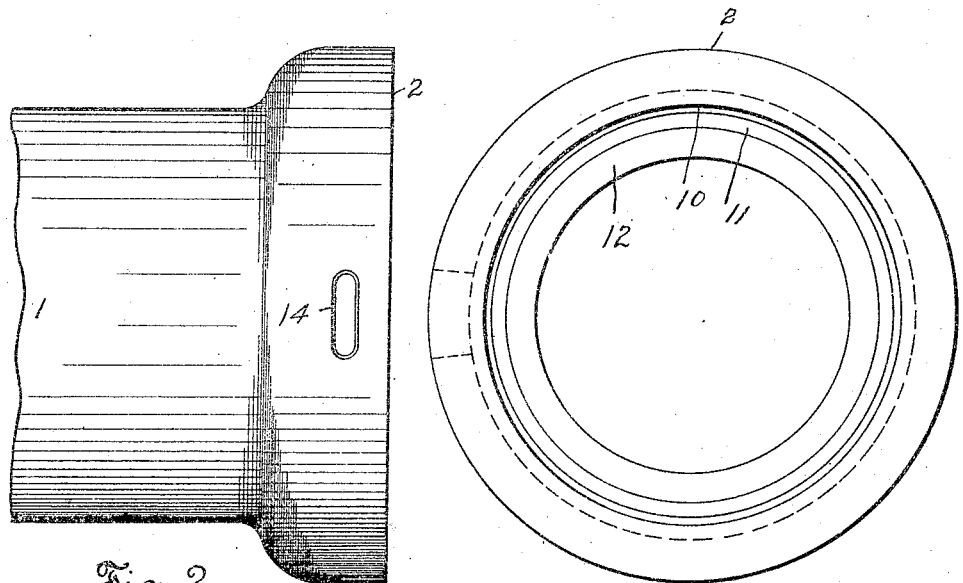
Fig. 2.
Fig. 3.
Witnesses:
J. L. Sarbacher.
Charles E. Garitee
Inventor:
Albert J. Boyle
By Chapin & Ferguson
Attorneys

UNITED STATES PATENT OFFICE.

ALBERT J. BOYLE, OF BALTIMORE, MARYLAND.

SEWER-PIPE.

1,158,415.

Specification of Letters Patent.

Patented Oct. 26, 1915.

Application filed February 7, 1914. Serial No. 817,091.

*To all whom it may concern:*

Be it known that I, ALBERT J. BOYLE, a citizen of the United States, residing at Baltimore, in the State of Maryland, have invented certain new and useful Improvements in Sewer-Pipes, of which the following is a specification.

This invention relates to improvements in reinforced concrete sewer pipes for use in constructing sewers or other conduits, and has for its object to provide a pipe, or section, with a bell end and a spigot end, the latter being adapted to fit within the former, and each having a groove therein which coincides with each other when the pipes, or sections, are fitted together, and each of said ends having loops projecting into said groove, whereby when the pipes, or sections, are assembled the joints may be filled with concrete, or cement, without the use of bands or similar devices to prevent the filling material from running out of said joints, thus forming a locked reinforced sealed joint between each pipe or section.

The invention consists of the novel construction and arrangement of the parts and combination of parts hereinafter more fully set forth in the following specification and pointed out in detail in the appended claim.

In the accompanying drawings.—Figure 1 is a vertical section of the bell and spigot ends of a pipe assembled with the concrete filling in the joint. Fig. 2 is a top plan view of the bell end showing the hole through which the concrete is poured when the pipes or sections are in position. Fig. 3 is an end view of Fig. 2.

Referring to the accompanying drawing, forming part of this specification, and in which like reference numerals designate like parts throughout the several views thereof, 1 designates a pipe, or section, having a bell end 2 and a spigot end 3. The pipe 1 is provided with corrugated reinforcing rods 4 extending longitudinally thereof and projecting out to near the spigot end 3 to reinforce the same and their other ends projecting down on an incline into the bell end, then running longitudinally of said end and have their extremities bent inwardly at right angles, and the corrugated reinforcing rods 5 extending around the said rods 4. The spigot end 3 is provided with a beveled surface 6 at the end thereof and a shoulder 7 just back of said beveled surface, and an annular groove 8 on its outer surface just back of the said shoulder 7. This groove 8 is provided with metal loops 9 projecting therein and arranged at a suitable distance apart, and which are even with or below the surface of the pipe. The bell end 2 of the pipe is provided with a shoulder 10 against which the spigot end impinges, and a beveled surface 11 and a shoulder 12 against which the beveled surface 6 and shoulder 7, respectively, impinge. The bell end 2 is also provided with an annular groove 13 on its inner surface which coincides with the groove 8 of the spigot end when the pipes are assembled, as shown in Fig. 1, and has an elongated slot or hole 14 at the top thereof leading in to the groove 13. This groove 13 is also provided with metal loops 15 projecting therein and arranged at a suitable distance apart and all of which are even with or below the outer surface of said groove. The ends of the metal forming the loops 9 and 15 are embedded in the body of the pipe. The loops 9 and 15 being below the outer surfaces of the grooves 8 and 13 they will not strike or interfere in any manner when the spigot end is being pushed into the bell end of the pipe or section. When the pipes, or sections, are assembled the cement, or concrete, filling is poured into the hole 14 and flows around the grooves 8 and 13 filling the latter and surrounding the loops 9 and 15, whereby a reinforced locked and sealed joint is formed between the said pipes or sections.

It will be seen from the foregoing that the spigot end fits so close within the bell end that the concrete, or cement, filling can be poured into the joints without the use of bands, or similar devices, being used to hold the filling into the joints until it sets.

Having thus described my invention, what I claim is:

A pipe having a bell end provided with an annular groove in its inner surface and a hole leading into said groove from the outer surface, a spigot end provided with an annular groove in its outer surface adapted to coincide with the groove in the bell end when the two pipes are fitted together, a number of reinforcing rods extending longitudinally of the pipe and each having one end projecting out to near the outer edge of the spigot end and its other end projecting down on an incline into the bell end, then running longitudinally of said end and having its extremity bent inwardly at right angles beyond the annular groove of the bell end, a number of metal loops formed of separate wires each having its ends projecting through the reinforcing material, said loops being entirely within the annular groove of the bell end, and a number of metal loops formed of separate wires each having its ends projecting through the reinforcing material, said last-mentioned loops being entirely within the annular groove of the spigot end, whereby when the spigot end of one section is forced into the bell end of the adjoining section the said loops will not come in contact with the impinging surfaces of the adjoining sections.

In testimony whereof I affix my signature in presence of two witnesses.

ALBERT J. BOYLE.

Witnesses:
CHAPIN A. FERGUSON,
EMMA BELL.